United States Patent [19]

Langley et al.

[11] 4,076,894

[45] Feb. 28, 1978

[54] ELECTRICAL CIRCUIT ELEMENT COMPRISING THICK FILM RESISTOR BONDED TO CONDUCTOR

[75] Inventors: Robert C. Langley, Millington; Muriel Abrash, Paterson, both of N.J.

[73] Assignee: Engelhard Minerals & Chemicals Corporation, Iselin, N.J.

[21] Appl. No.: 626,136

[22] Filed: Oct. 28, 1975

Related U.S. Application Data

[60] Division of Ser. No. 521,937, Nov. 7, 1974, Pat. No. 3,951,672, which is a continuation of Ser. No. 301,102, Oct. 26, 1972, abandoned.

[51] Int. Cl.$^2$ .............................................. B32B 17/06
[52] U.S. Cl. .................................... 428/428; 252/514; 252/518; 338/308; 427/101; 428/434; 428/901
[58] Field of Search ....................... 252/514; 427/101; 428/428, 901, 434

[56] References Cited

U.S. PATENT DOCUMENTS

| | | | |
|---|---|---|---|
| 3,293,501 | 12/1966 | Martin | 252/514 X |
| 3,304,199 | 2/1967 | Faber, Sr. et al. | 252/514 X |
| 3,324,049 | 6/1967 | Holmes | 252/514 |
| 3,352,797 | 11/1967 | Kim | 252/514 |
| 3,655,440 | 4/1972 | Brady | 252/514 X |
| 3,682,840 | 8/1972 | Van Loan | 252/518 |
| 3,830,651 | 8/1974 | Minneman et al. | 252/514 X |

Primary Examiner—Richard D. Lovering

[57] ABSTRACT

Thick film resistive elements are prepared from an intimate admixture comprising silica, lead oxide and ruthenium dioxide or iridium dioxide which is heated to a temperature sufficient to provide a lead-containing glass having dispersed therein lead ruthenate or lead iridate. The lead-containing glass is comminuted and a resistor paste is formed which can be subsequently coated and fired on to a desired substrate to form the thick film resistive component. The method of this invention may facilitate the production of thick film resistors exhibiting a low temperature coefficient of resistivity, relative freedom from noise and drift, and high moisture resistance.

4 Claims, No Drawings

ELECTRICAL CIRCUIT ELEMENT COMPRISING THICK FILM RESISTOR BONDED TO CONDUCTOR

This is a division of application Ser. No. 521,937, filed Nov. 7, 1974, now U.S. Pat. No. 3,951,672, which in turn is a continuation of application Ser. No. 301,102, filed Oct. 26, 1972, now abandoned.

The present invention relates to the manufacture of thick film resistive elements, and particularly to a method of making a resistive composition which exhibits a low temperature coefficient of resistivity (TCR), relative freedom from noise and drift, and high moisture resistance. The properties of the resistive elements produced by the present invention are relatively insensitive to minor variation in process conditions during their manufacture and are able to be reproduced with a relatively high degree of accuracy, and separate elements exhibiting widely differing resistance can be made.

In accordance with the present invention glass frit suitable for the manufacture of thick film resistives is prepared from an intimate admixture comprising silica, lead oxide and ruthenium dioxide or iridium dioxide wherein the lead oxide-containing glass is produced and lead ruthenate or lead iridate is formed in situ and is well dispersed as solid particles in the glass matrix. The lead ruthenate or lead iridate component serves as an electrical conductor in a resistive element. Additionally, other materials, especially a boria component, may be incorporated into the glass thereby providing a modified glass, e.g. a lead borosilicate glass. Thick-film resistors may be produced by comminuting the lead oxide-containing glass, formulating the comminuted glass into a resistor paste composition, applying the resistor paste to a substrate, and baking the coated substrate. Other materials may also be included in the composition, for instance, other electrically-conductive metal components.

As electronic circuitry becomes more complex and emphasis is placed on not only high performance, but also the miniaturization of such circuitry, new techniques for circuit fabrication and circuit design are required. Widespread adoption of printed circuits and hybrid integrated circuits has resulted to achieve miniaturization of electronic components. The development of thick film passive circuit elements is one factor which has enabled the manufacture of such microcircuits. The components for thick film elements which exhibit various electrical characteristics are in the form of fine powder which can be consolidated on a solid substrate by firing. The powder is usually applied to the substrate in a paste form using a graphic arts process, and the resulting film is often in the neighborhood of about 0.2 to 1.5 or more mils in thickness. Thick film resistive elements are normally formed from a mixture of finely divided ceramic powder such as glass, ceramics, and glazed (glass coated) ceramics, with fine metal-containing particles. These resistive elements are commonly referred to as "cermet" resistive elements since they are derived from a combination of ceramic and metal materials. The formation of the thick film should desirably be reproducible in order that a thick film resistive element can be manufactured with a high degree of reliability and uniformity of electrical characteristics and without undue sensitivity to minor changes in the process conditions during manufacture. Further, due to their employment in complex circuitry, the thick film resistive elements should exhibit a relative freedom from undue variation in electrical characteristics due to changes in environmental conditions such as temperature, pressure, and humidity. Thick film resistors should be free from rough surface characteristics, high noise characteristics; undue drift; and the like which impair beneficial employment in circuitry and should exhibit a high moisture resistance.

The resistance of thick film resistive elements, referred to as sheet resistance, is usually measured in "ohms per square", a parameter which considers only the amount of area taken up on a substrate by a given resistance. Resistance values of thick film resistors are obtained by measuring the resistance between parallel sides of the film and dividing that value by the least number of geometric squares formed on the surface of the film having the width of the film as one side. Typically, a uniform film thickness of 1 mil is employed. Temperature coefficient of resistance (TCR), generally expressed in parts per million per degree centigrade (ppm/° C), is an important characteristic of resistors since changes in temperature can create relatively large changes in resistance. A value for TCR is generally obtained by measuring the resistance of a resistive element at various temperatures, and often the variation of resistance of a resistive element due to a change in temperature is non-linear in nature. If the TCR is too high, inevitable changes in ambient temperature in many modern applications of electronic circuits could lead to serious consequences. Thus, if a resistance element with a TCR of 1000 ppm/° C. were used in a circuit subjected to a 100° C. change in ambient temperature, the resistance thereof would change by a factor of 10%.

Ruthenium dioxide and iridium dioxide have been employed in resistive compositions in the prior art. These compositions have, under carefully controlled conditions, exhibited advantageous properties including low TCR and relative freedom from drift and noise. Often, however, various of the prior art processes require several process steps each of which may affect the properties of a resistor made therefrom, and the properties of the resistors, while being improved from conventional resistor materials, often still do not meet the exacting qualities desirable for modern applications nor are they reproducible within a reasonable degree of variation.

There is provided by the present invention a method for the production of cermet compositions which are suitable for use as thick film resistive elements having low TCR values. Thick film resistors made in accordance with the present invention demonstrate, in addition to improved TCR, other desirable characteristics such as low noise, freedom from undue rough surfaces, improved moisture resistance, and low drift after extended use. Where the TCR of a resistor element is relatively unimportant, for instance, where the electronic component is operating at a constant temperature in, for example, a sensitive infrared detecting apparatus where the performance of the apparatus is enhanced by maintaining it at low, constant temperatures, often at the temperature of liquid nitrogen, the resistive elements of the present invention are still highly advantageous not only due to good electrical properties but also to the uniformity and ease of manufacture of the resistive material. The process of the present invention facilitates the production of thick film resistors having a high degree of reproducibility and uniformity with minimal sensitivity to changes in the process conditions employed.

By the present invention, glass frit, suitable for incorporation into thick film resistors, can be prepared by admixing the ingredients in amounts used to form conventional lead oxide-containing glasses, e.g., silica and lead oxide components, with a minor amount of one or both of ruthenium dioxide and iridium dioxide. The mixture is then heated to a temperature which will promote the formation of lead ruthenate or lead iridate, generally at least about 600° C., often about 850° to 1100° C., preferably about 900° to 1050° C. for a time sufficient to form a glass containing lead ruthenate or lead iridate, usually for at least about 0.3 or 0.5 of an hour. Times exceeding about 24 hours do not appear necessary, especially when higher temperatures are employed, and preferably the time is about 0.5 to 16 hours. Preferably, the temperature and time of the glass-forming heating is sufficient to convert a major portion, more preferably essentially all, of the ruthenium dioxide or iridium dioxide to lead ruthenate or lead iridate. The formed glass is cooled and comminuted or micronized, usually after quenching, to provide a frit of a suitable particle size which can advantageously be incorporated into a resistor paste composition for the manufacture of thick film resistors. The glass frit of this invention not only has highly advantageous electrical properties, but also other physical properties which facilitate its employment in thick film resistors since the lead ruthenate or lead iridate-containing glass frit behaves essentially the same as single phase glass.

The relative amounts of silica, lead oxide and ruthenium dioxide or iridium dioxide components used in making the glass of this invention may vary over a wide range. The lead ruthenate and lead iridate present in the formed glass is usually a minor portion based on the weight of the glass, but the amount is sufficient to provide an electrically-conductive glass. Advantageously, the total mole ratio of lead oxide and silica to the total ruthenium dioxide or iridium dioxide used in making the glass is about 2:1 to 50:1, preferably about 5:1 to 40:1. The ratio of lead oxide to silica is normally about 0.1:1 to 4:1, preferably about 1:1 to 2:1, on a mole basis. The lead oxide and silica combine during formation of the glass to provide lead silicate. Preferably the ruthenium dioxide and iridium dioxide are finely divided and, most preferably, are less than about 150 or 50 microns in average particle size. The preferred essential conductive component of the glass frit is lead ruthenate formed from ruthenium dioxide or lead iridate formed from iridium dioxide.

Other oxide components may be incorporated into the glass composition employed in this invention, such as, for instance, oxides of calcium, strontium, aluminum, cadmium, boron and the like. A particularly advantageous component is boria which combines with lead oxide and silica to form lead borosilicate. Lead borosilicate glasses possess generally lower melting points than do lead silicate glasses and often provide ruthenium- or iridium-containing glass frits having a more stable TCR. Advantageous lead borosilicate glasses have essentially identical thermal coefficients of expansion to common substrate materials, for example, alumina. Desirably, the ratio of lead silicate to boria is from about 3.5:1 to 30:1, preferably about 4:1 to 25:1, on a mole basis. Opacifiers and other agents which improve the physical properties of the glass may also be employed. Since ruthenium is in the preferred conductive component, the remaining discussion will primarily be directed to the use of a ruthenium component; however, this is for ease of understanding the present invention and it is to be understood that the ruthenium component may be replaced entirely or only in part by the corresponding iridium component.

The mixture of the glass-forming components and ruthenium dioxide or iridium dioxide is heated to a temperature sufficient to form a molten mass of glass. Ruthenium dioxide or iridium dioxide, being relatively insoluble in glass will remain in the solid phase. Glasses, in general, have relatively imprecise softening points and gradually melt, forming less viscous solutions as the temperature is increased. Advantageously, the glass-forming components employed in the present invention will be heated in their molten state to a temperature at which the viscosity is sufficiently high in order to retain the solid ruthenium or iridium components in dispersion. Preferably, the solid ruthenium- or iridium-containing particles are in relatively uniform dispersion within the glass matrix. The temperature which will provide a solution of advantageous viscosity may vary with the composition of the glass. For instance, lead borosilicate glasses generally have a lower melting point than lead silicate glasses. Similarly the relative amounts of each of the components will have an effect upon the melting point of the glass. Generally the melting point of the glass composition in this invention will be from about 550° to 800° C.

Along with the formation of lead silicate glass, the ruthenium dioxide will react with the lead component in the glass composition to form lead ruthenate. The reaction proceeds in the solid phase. The product, lead ruthenate, is relatively insoluble in the glass and is present in the solid phase. Usually at least a major amount, preferably essentially all, of the ruthenium is converted to the bimetal salt. When employing temperatures in excess of 1000° C., it may be desirable to conduct the heating in an inert atmosphere. Free oxygen from, for example, air may react with ruthenium dioxide or lead ruthenate to form ruthenium tetroxide which will be a gas at those conditions. High temperatures, e.g., above about 1100° C., may promote the degradation of lead ruthenate. The time for which the solution is maintained at the temperature for conversion of ruthenium dioxide to lead ruthenate may depend upon numerous considerations such as the temperature employed, the relative concentration of ruthenium, the relative concentration of lead, the desired degree of conversion, and the like. Generally, the solution will be maintained at the peak temperature for about 0.3 to 24, preferably 0.5 to 16, hours. It may be desirable to provide a means for agitating the mixture to maintain the insoluble lead ruthenate in a relatively uniform dispersion. Surprisingly, by maintaining a suitable viscosity for the glass melt, the lead ruthenate can be kept in a reasonably uniform dispersion without agitation.

The molten glass is solidified by cooling. Desirably, the molten glass is immediately quenched in cool or cold water. The quenching serves a two-fold purpose. First, the quenching will result in the shattering of glass, thus the amount of grinding required to obtain frit of the desired particle size is reduced, and second, the quenching serves to fix the relatively uniformly dispersed lead ruthenate in the glass matrix. The glass is preferably comminuted or micronized to an average particle size of less than about 20 microns, most preferably less than about 10 microns, e.g., about 0.5 to 5 microns. The comminuting of the glass may be accomplished by, for example, ball milling and the like. Methanol, ethanol, water, and the like may be conveniently employed as a liquid phase material for ball milling. The comminuted glass frit may be stored indefinitely without significant, if any, deterioration.

The comminuted glass frit containing the lead ruthenate can be prepared into a resistor paste for use in forming thick film resistors. The term resistor paste as used herein refers to pastes or more fluid slurry compositions. The glass frit may be admixed with up to about 90, preferably about 5 or 10 to about 80, weight percent additional glass frit to adjust the metal component concentrations. The additional glass frit may be used as such or have a metal component therein. Thus, for instance, by increasing the amount of added glass frit, the sheet resistance of a resulting thick film resistor is increased. A metal component such as about 1 to 10 weight percent precious metal, for example, platinum, rhodium, and the like based on the additional glass frit may be useful for thick film resistors. Such metal components may also be incorporated in or on the lead ruthenate or lead iridate-containing glass. Advantageously, the resistor paste can be prepared from an admixture of glass frit of low resistance, e.g., about 1 to 100 ohms per square, and glass frit of high resistance, e.g., about 50K to 100K ohms per square, made in accordance with this invention. The ratio of each glass frit can be varied to obtain the desired resistivity. The glass frit components can be incorporated into a paste by mixing or milling the glass frit with a liquid vehicle, which may include a thickener, e.g., ethyl cellulose, rosin or the like; a liquid carrier such as methanol, ethanol, acetone, methyl ethyl ketone, terpineol, pine oil, oil of spike, camphor oil, lavender oil, oil of petitgrain, other organic solvents, water and the like; and, optionally, stabilizing agents and wetting agents. The resulting resistor paste may often have about 50 to 80 percent solids and about 20 to 50% vehicle. The viscosity of the resistive paste may affect the thickness of the thick film resistor and, hence, may affect the resistance of the resistor thusly formed. The resistor paste may be applied to a suitable base or substrate by various convenient means such as brushing, spraying, stenciling, screening, printing and the like. Beneficially, the method of application of the resistor material provides a thick film coating of relatively uniform thickness. Typical solid substrate materials are electrically non-conductive, able to withstand the high temperatures used in firing the resistor to the substrate, have a smooth, fine textured surface characteristic, and are virtually impervious to moisture and other liquids. Often, the substrate is of a ceramic nature. Steatite, fosterite, sintered or fused aluminas, zircon porcelains, and the like, can be employed as substrates.

A further consideration in the production of thick film resistors is their adaptability to other circuit elements, such as conductors. The thick film resistor should bond securely and without imperfection which would adversely affect its electrical characteristics. For instance, the blistering or separation of the resistive material from a conductor would provide an increase in the resistance of the unit and no satisfactory reliability or predictability in manufacture could be achieved. The resistive compositions of the present invention have been found to be particularly compatible with platinum conductive elements. The conductor component which may be bonded to thick film resistors is also desirably selected to be compatible with the resistor with respect to physical properties such as thermal expansion, especially where the circuit is subjected to widely varying temperatures. It has been found that a conductor comprising a glass frit having similar physical properties, e.g., thermal expansion, melting characteristic, and the like, to the resistor component and a finely-divided, electrically-conductive component is advantageous. The electrically-conductive component is in a sufficient amount to provide a conductor with the desired electrical properties and may comprise about 50 to 99, preferably 80 to 98, percent of the conductor. Excellent bonding of the thick film resistor of this invention to the conductor has been observed using platinum as the electrically-conductive component in the conductor. The glass frit for the conductor may conveniently be the same glass frit as used for the thick film resistor.

After the resistor paste is applied to the substrate, it is normally allowed to dry by evaporating the carrier at a low heat. Warm air may be circulated over the applied resistor paste to assist in evaporation of the carrier. The vehicle employed in the resistor paste will generally contain sufficient binder that, when dried, the surface of the dried resistive paste will be sufficiently strong such that the substrate can withstand normal handling without marring or blemishing the dried resistive paste.

The resistive material can then be fired to fuse the frit into a continuous glassy phase in a conventional lehr or furnace by gradually increasing the temperature to a peak temperature of at least about the temperature at which the frit becomes molten and a smooth, continuous glass phase is formed. Firing temperatures which are too low may provide a discontinuous resistive element providing erratic resistance values. Desirable temperatures for firing are in the range of about 600° to 900° C., preferably about 600° to 850° C. The conditions employed for fusing the resistor paste to the substrate may be less severe than those employed for the formation of the lead ruthenate, e.g., generally a temperature of at least about 100° C. less than that for the formation of the lead ruthenate is employed, since the lead ruthenate is essentially completely formed in the melt heating step. The furnace is preferably held at the maximum peak firing temperature for at least about five minutes to insure the production of a continuous glassy phase with a smooth surface. Often the substrate is held or soaked at the maximum peak firing temperature from about 10 to 30 minutes or more. Excessive peak temperatures and fast heating rates may cause blisters or bubbles on the thick film resistor and may cause agglomeration of the metallic components. Substrates such as alumina may react with the glass frit containing lead ruthenate to an undesirable extent at high temperatures, e.g., in excess of about 1000° C. The temperature of the furnace can be slowly reduced after reaching and maintaining the desired peak temperature to insure that the thick film resistor is relatively free from spalling or undue stresses due to more rapid cooling which may affect the performance or properties of the resistor.

The lead ruthenate- or lead iridate-containing glass frit is an advantageously employed thick film resistor due to the beneficial fusion temperatures, coefficient of thermal expansion, fluidity, and the like. The thick film resistors are moisture resistant, fuse to a smooth glossy surface upon heating to a temperature above the melting point of the glass, and have low TCR, relative freedom from noise and drift, and relative insensitivity from minor variations in the process condition of their manufacture. The process of this invention enables the production of thick film resistors with uniform and predictable electrical characteristics and provides for the economic and efficient use of metal values. The thick film resistors prepared with the glass frit of this invention can provide a range of elements of low or high resistivity with a low TCR. The higher resistances may be in excess of about 5,000 or 8,000 to 1,000,000 or more ohms per square, and products can be made which show little, if any, change in electrical characteristics upon extended use.

The following examples are presented to further illustrate the present invention. All parts and percentages referred to are by weight unless otherwise indicated. In the following examples, the resistive element is prepared essentially in the same manner as illustrated in Example I.

EXAMPLE I

An admixture of 22.32 grams (g.) lead oxide, 4.50g. silica, and 3.33g. ruthenium dioxide (mole ratio of $PbO:SiO_2:RuO_2$ being 4:3:1) is prepared having essentially uniform dispersion. This mixture is placed in a porcelain crucible and heated to 1000° C. for 30 minutes to provide a molten solution having a dispersion of ruthenium-containing components. This material is quenched in water and ground and sieved through a 325 mesh screen (U.S. Standard Sieve Series) to give a powder. X-ray diffraction of this material in powder form shows that it is a mixture of two crystalline phases, lead ruthenate and ruthenium dioxide, in an amorphous phase. The resultant glass frit is formulated in a resistive paste by admixing 7 parts by weight of the powder with 2 parts rosin (50%) dissolved in oil of spike, ⅓ part lavender oil, ⅓ part camphor oil, and ⅓ part oil of petitgrain. The paste is screened onto an alumina substrate to a thickness of about 0.6 to 1.2 mils. The film is dried and then fired at 800° C. for 30 minutes. The thick film resistive is a continuous film of a smooth, glassy appearance and is bonded well to the substrate. Approximate resistivity measurements are made with the film exhibiting a resistance of 90 ohm-cm at 25° C., 100 ohm-cm at 100° C., and 110 ohm-cm at 200° C.

EXAMPLES II–VI

Example I is repeated except that varying amounts of glass-forming components to ruthenium dioxide are used. The results are provided in Table 1. Examples IV and V are for comparison purposes. The erratic resistivity readings are probably due to the low concentration of electrically-conductive material.

Table 1

| Example | Moles of PbO | $SiO_2$ | $RuO_2$ | Resistivity at 25° C., ohms-cm |
|---|---|---|---|---|
| II | 8 | 6 | 1 | 6K |
| III | 10 | 12 | 1 | 120K |
| IV | 32 | 24 | 1 | erratic |
| V | 64 | 48 | 1 | erratic |
| VI | 2 | 1 | 1 | 10 |

EXAMPLE VII

Example I is repeated except that the ruthenium dioxide is ground to pass through a 325 mesh screen. The thick film resistor has a resistivity of about 12K ohm-cm at about 100° C.

EXAMPLES VIII to X

Example VII is repeated except the melting is conducted at 1000° C. for 16 hours and the thick film resistors are fired at varying temperatures. The results are provided in Table 2.

Table 2

| Example | Peak firing temperature, ° C (30 minutes) | Resistivity, ohms | TCR ppm/° C |
|---|---|---|---|
| VIII | 700 | 70K | −400 |
| IX | 800 | 4K | +230 |
| X | 900 | 8K | +330 |

The samples prepared at 700° C. are dull and granular in appearance. This is apparently due to the use of an inadequate temperature to provide melting of the glass frit.

EXAMPLE XI

Example IX is repeated except employing a composition having a mole ratio of lead oxide to silica to ruthenium dioxide of 8:7:1. The resulting resistor has a resistivity of 50K ohms and a TCR of +80 ppm/° C. Further samples of the resistor of this example are prepared with a variation in TCR from +358 to −630 ppm/° C. This variation is attributed to a thermal expansion mismatch with the substrate and due to differences in the resistor film thickness due to simple hand application of the resistor paste to the substrate.

EXAMPLE XII

A mixture of 1 part by weight lead borate per three parts of the composition of Example XI is prepared and treated in the same manner as in Example XI. The resistor paste is applied to alumina substrates and fired at 700° C., 750° C., and 800° C. for 30 minutes. The results are provided in Table 3.

Table 3

| Peak firing temperature | No. of Samples | Highest TCR ppm/° C | Lowest TCR ppm/° C | Average TCR, ppm/° C dropping highest and lowest value |
|---|---|---|---|---|
| 700° C | 7 | +196 | +19 | +69 |
| 750° C | 1 | +102 | 0 | +34 |
| 800° C | 14 | +312 | +66 | +170 |

EXAMPLE XIII

This example illustrates the effect of a melt which is heated to a temperature which for this formulation provides a melt having a viscosity which is insufficient to maintain a satisfactory dispersion of lead ruthenate. A mixture of 17.83g. lead oxide, 3.60g. silica, 7.70g. lead borate, and 1.33g. ruthenium dioxide which passes through a 325 mesh screen is prepared and heated in a platinum crucible to 1000° C. for 16 hours. The mixture is noticeably relatively fluid. The melt is poured into water and is ground to pass through a 325 mesh screen. Resistors are prepared in the usual manner and the results are provided in Table 4.

Table 4

| Peak firing temperature | No. of Samples | Highest TCR ppm/° C | Lowest TCR ppm/° C | Average TCR, ppm/° C dropping highest and lowest value |
|---|---|---|---|---|
| 650° C | 4 | 710 | 411 | 549 |
| 700° C | 4 | 478 | 439 | 467 |
| 750° C | 4 | 716 | 433 | 455 |

The high TCR readings are apparently caused by the inability of the lead ruthenate to remain in uniform dispersion in the relatively fluid melt.

EXAMPLE XIV

Example XIII is repeated except only 3.10g. of lead borate are used. The heated mixture is more viscous at the maximum melt temperature, and lower TCR values are obtained. The results are presented in Table 5.

Table 5

| Peak firing temperature | No. of Samples | Highest TCR ppm/° C | Lowest TCR ppm/° C | Average TCR, ppm/° C dropping highest and lowest value |
|---|---|---|---|---|
| 650° C | | only partial melting occurred | | |
| 700° C | 6 | −281 | +42 | −119 |
| 750° C | 7 | +242 | +4 | +148 |

EXAMPLE XV

Example XIV is repeated except employing 1.55g. lead borate monohydrate. The peak firing temperatures are 700°, 750°, and 800° C. for 30 minutes. The resistors fired at 700° C. only partially melted and values for TCR are not obtained. The results are provided in Table 6.

Table 6

| Peak firing temperature | No. of Samples | Highest TCR ppm/° C | Lowest TCR ppm/° C | Average TCR, ppm/° C dropping highest and lowest value |
|---|---|---|---|---|
| 750° C | 6 | −320 | −8 | −40 |
| 800° C | 6 | 306 | 138 | +198 |

EXAMPLES XVI and XVII

Example XV is repeated except no preforming of the glass is employed, i.e., the glass is formed on the substrate. In Example XVII, 0.75 micron particle size ruthenium dioxide powder is employed, but the preparation of the sample is otherwise the same as Example XVI. The results are provided in Table 7.

Table 7

| Example | Run | TCR, ppm/° C. 1 | 2 | 3 |
|---|---|---|---|---|
| XVI | | 0 | 36 | 233 |
| XVII | | 271 | 327 | 1234 |

Without the preforming step, the values obtained for TCR apparently vary considerably more.

EXAMPLE XVIII

Example XV is repeated except that the melt is heated to a maximum temperature of 900° C. The melt at 900° C. pours easily into water. X-ray diffraction indicates that lead ruthenate is the only crystalline phase. Thus, essentially all of the ruthenium dioxide is converted to lead ruthenate under the conditions employed in forming the melt. Further, the electrical measurements indicate that the viscosity of the melt at the peak temperature of 900° C. is advantageous in maintaining the lead ruthenate particles in a substantially uniform dispersion. The resistive material is employed to make resistors of short (about 1/16 inch), average (about 3/16 inch), and long (about ½ inch) lengths and the resistors are defined at different temperatures. The results are provided in Table 8.

Table 8

| Peak firing temperature, ° C | Time, min. | Length | No. of Samples | Average TCR, ppm/20 C dropping highest and lowest value |
|---|---|---|---|---|
| 700 | 30 | average | 7 | −170 |
| 750 | 30 | long | 10 | 51 |
| 750 | 60 | average | 11 | 82 |
| 750 | 30 | short | 8 | −40 |
| 800 | 30 | average | 9 | 165 |

EXAMPLE XIX

Example XVIII is repeated except employing iridium dioxide instead of ruthenium dioxide in an equivalent amount on a mole basis. A mixture of 17.84g. lead oxide, 3.60g. silica, 1.52g. lead borate monohydrate and 2.25g. iridium dioxide is prepared and heated to 900° C. for 16 hours. It is formulated in a resistor paste in the usual manner and printed on an alumina substrate with platinum terminals. The resistor is fired at 750° C. for 30 minutes. The number of runs conducted are seven with the highest TCR being 503 ppm/° C. and the lowest, 139 ppm/° C. The average TCR is 322 ppm/° C.

EXAMPLE XX

Example XVIII is repeated except that the conductor material from the thick film resistor is derived from 95 parts platinum and 5 parts of the resistive composition of Example XVIII. This conductor enables a simple system to be provided for the manufacture of circuits containing thick film resistors which have increased stability due to the use of identical glass phases in the resistor and the conductor element. The resistors are fired at 750° C. for 30, 60, and 90 minutes and at 800° C. for 10, 20, and 30 minutes. The results are provided in Table 9.

Table 9

| Peak firing temperature, ° C | Time, minutes | No. of Samples | Average TCR/° C dropping highest and lowest value |
|---|---|---|---|
| 750 | 30 | 11 | 120 |
| 750 | 60 | 11 | −21 |
| 750 | 90 | 18 | 20 |
| 800 | 10 | 10 | 157 |
| 800 | 20 | 10 | 130 |
| 800 | 30 | 11 | 177 |

It is claimed is:

1. An electrical circuit element comprising a thick film resistor comprising preformed glass frit, wherein the glass frit is produced by heating a finely-divided mixture of glass-forming proportions of lead oxide and silica, and a minor amount of a member selected from the group consisting of ruthenium dioxide and iridium dioxide to a temperature sufficient to form a glass melt containing lead ruthenate or lead iridate, whereat the viscosity of the melt is sufficiently high to maintain the lead ruthenate or lead iridate in relatively uniform dispersion in the glass melt, cooling and comminuting the mixture to provide the glass frit, said resistor being bonded to a conductor comprising glass frit and a sufficient amount of an electrically-conductive component to provide the desired electrical properties.

2. The electrical circuit element of claim 1 wherein the electrically-conductive component is platinum.

3. The electrical circuit element of claim 1 wherein the glass frit in the conductor is produced by heating a finely-divided mixture of glass-forming proportions of lead oxide and silica, and a minor amount of a member selected from the group consisting of ruthenium dioxide and iridium dioxide to a temperature sufficient to form a glass melt containing lead ruthenate or lead iridate, whereat the viscosity of the melt is sufficiently high to maintain the lead ruthenate or lead iridate in relatively uniform dispersion in the glass melt, cooling and comminuting the mixture to provide the glass frit.

4. The electrical circuit element of claim 3 wherein the electrically-conductive component is platinum.

* * * * *